Sept. 25, 1956 M. B. JOHNSON 2,764,627

TELEVISION SYSTEMS

Filed Jan. 18, 1952 3 Sheets-Sheet 1

INVENTOR
M. BERNARD
JOHNSON

BY Hyman Hurvitz

ATTORNEY

Sept. 25, 1956 M. B. JOHNSON 2,764,627
TELEVISION SYSTEMS
Filed Jan. 18, 1952 3 Sheets-Sheet 2

INVENTOR
M. BERNARD JOHNSON

BY Hyman Hurvitz
ATTORNEY

Sept. 25, 1956 M. B. JOHNSON 2,764,627

TELEVISION SYSTEMS

Filed Jan. 18, 1952 3 Sheets-Sheet 3

INVENTOR
M. BERNARD JOHNSON

BY Hyman Hurvitz

ATTORNEY

United States Patent Office 2,764,627 Patented Sept. 25, 1956

2,764,627

TELEVISION SYSTEMS

Marvin Bernard Johnson, Montgomery, Ala.

Application January 18, 1952, Serial No. 267,031

9 Claims. (Cl. 178—5.2)

The present invention relates generally to television receiving systems, and more particularly to color television systems, of the type in which is effected transformation of monochrome picture elements into color picture elements.

Many systems of color television are presently known to those skilled in the pertinent art. The system which has presently won the approval of the Federal Communications Commission is that known as the CBS system. This system is one in which successive color fields are viewed at a color television camera in succession through differently colored filters, which may be, for example, red, blue and yellow. Accordingly the television camera at the transmitter generates signals representative of the different colored components of a color picture in succession, and transmits the corresponding signals in succession to a receiving device. At the receiving device the pictures are translated into monochrome or black and white pictures, but are viewed in succession through differently colored filters, corresponding with those at the transmitter, and in the same order, and in synchronism with the action at the transmitter, so that a color picture is recreated from the successive monochrome pictures.

The presently conventional mode of interposing the properly colored filters before the television camera, and before the viewing screen at the receiver is mechanically to rotate a so-called color-wheel, having three differently colored segments, the latter being interposed between the eye of the observer and the black and white image in succession, at the receiver, and likewise being interposed in succession between a color scene and the camera at the transmitting station.

It is realized by those skilled in the art that the use of a color wheel before a monochrome television screen to create color images from black and white images is not a desirable mode of proceeding, since the color wheel must be very considerably larger than the picture which is to be transformed, and must be rotated at extremely high speeds, to avoid picture flicker. Considerable attention has therefore been given in the art to the production of television systems which require no moving parts in the generation of color pictures from black and white pictures, or which require moving parts which are small relative to the picture size.

It is to this same problem that I address myself in the present application.

In accordance with a first embodiment of the present invention, I utilize a television image screen, the opacity of which changes from point to point in accordance with the intensity values of video signals, so that the picture may be viewed in terms of the light passed by the screen, and derived in a relatively intense form from the screen. Screens of this type are well known per se, and have been described in U. S. Patent to Rosenthal, Reissue No. 22,628, and in Smith Patent No. 2,473,825, and elsewhere. In accordance with the present invention I filter the light passing to the image screen, by means of a dichroic filter, which is controlled in synchronism with the production of color fields, in a color television system, so that the light passing through the image screen is in succession red, blue and yellow, and so that from successive monochrome fields, color fields are created, and consequently a color television picture. Since the dichroic filter may be controlled electrically, no moving parts are required in this embodiment of my invention, in order to translate monochrome images into color images.

In accordance with a variant of the first described embodiment of my invention, I utilize a two gun cathode ray tube having an image screen of the Rosenthal or Smith type and a separate fluorescent screen. I utilize one of the guns of the two gun tube to paint monochrome images on the Rosenthal or Smith screen, utilizing the other gun to produce intense light in synchronism by scanning the beam over the fluorescent screen in synchronism with picture field production. The second gun is operated at extremely high voltages, and accordingly produces extremely brilliant illumination. The illumination deriving from the fluorescent screen is passed through a dichroic filter, the color transmission properties of which are controlled in synchronism with color field production, and the light deriving from the dichroic filter is passed through the image screen. In this way the screen is illuminated point by point in synchronism with production of monochrome images.

In accordance with a third embodiment of the present invention a two gun cathode ray tube is used, having a Rosenthal type screen, but in which the use of a dichroic filter is avoided, by employing a fluorescent screen as a light source which is coated over three discrete areas thereof with fluorescent material capable of fluorescing in each of the primary colors, blue, yellow and red, each of these portions being provided with a lens for directing all the light produced thereby over the entire area of the screen. As each successive monochrome image is formed on the screen, in accordance with the character of the image represented by the signal, the second gun of the cathode ray tube is caused to scan an appropriate area of the fluorescent plate, thus producing intense light of suitable color. The light directed through the image screen is thereby constantly of the color required to generate colored television pictures.

I have further discovered that the fluorescent screen of a cathode ray tube is transparent to ordinary light, or to colored light, the transparency increasing with the degree of the fluorescence of the screen. If then a colored light is projected against a fluorescent screen, which of itself produces white light when a spot of the screen is caused to fluoresce, the colored light will pass through, and the fluorescing spot will appear to be colored. As the brightness of the fluorescing spot is decreased the quantity of colored light passing through the spot decreases, so that for a black spot very little colored light is transferred.

It follows that in the three embodiments of my invention above briefly described the Rosenthal or Smith type screen may be dispensed with, and an ordinary fluorescent screen employed instead, and the black and white pictures generated on that screen translated into colored pictures, in the same general manner as described for the Smith or Rosenthal screens.

The main and important difference is that in the case of a fluorescent screen the colored light is supplemented by the white light normally generated by the screen, and a very brilliant picture results. The colors in the pictures are diluted by the white light present, so that the brilliant hues present in the normal color television system are toned down. Far from being a defect, this property of my system leads to more pleasing and natural pictures than in the prior art, the pictures including some blacks and greys, which are totally absent from pictures generated in the normal CBS system.

Whereas I have described my system as employing sequentially differently colored light derived from a fluorescent screen, by means of a dichroic filter, I realize that electrical simplification of the system will result if the illumination of the various screens of the system, whether Rosenthal or Smith or normal fluorescent, in different colors, is accomplished by means of a color wheel, or by switching on differently colored lights in sequence. This simplification is accomplished at the cost of using mechanical devices, in the case of the color wheel, or at the cost of imperfection of operation in the case of sequential lighting, due to time lags of light build up and decay. Nevertheless, system of this character are eminently practical, and in the case of color wheels a very small wheel may readily be employed, the size of which need bear no relation to the size of the colored picture produced.

As a further group of modifications of the present invention, instead of passing colored light through Smith or Rosenthal or normal fluorescent screens, to obtain a colored picture, I pass a colored picture through the screen, in superposition of the picture traced thereon. I have found that thereby the coloring of the final picture, as presented to the eye of the viewer, is improved. The blacks and greys in the final picture are deepened, and made more pure, and the depth of color, keeping pace in respect to intensity with the black and white picture, at each point of the picture, is more nearly found in the scene transmitted than in the previously described systems. Basically, the percentage of dilution of hue in the pictures by white light, is maintained at a fairly constant value for all intensities of the picture, and where pure black is present in the original scene no color will be perceived by the viewer of the televised image.

The colored image, for superposition on the monochrome image generated on the normal fluorescent screen, or on the variable transparency of the Smith or Rosenthal screens, may be generated wholly electronically, by tracing monochrome pictures and filtering these by means of dichroic filters.

As still a further embodiment of my invention I may employ a novel screen for a television viewing tube, having internally of the tube a layer of the material of controllable transparency utilized in the screen of Smith U. S. Patent No. 2,473,825. The screen may then be illuminated in succession with light in the different primary colors, by means of a color wheel, or in any of the other modes above explained, to produce field sequential pictures, in the so-called CBS system, above briefly explained.

The fluorescent screen generates monochrome, or black and white pictures. The Smith screen provides control of transparency. Together the screens provide control of transparency to the colored light. There is produced, in another view of the matter, monochrome pictures by means of the fluorescent screen, a projected color image, by means of the Smith screen and the projected colored light, and a superposed colored image by means of the fluorescent screen and the projected colored light. In toto, there is produced a colored television picture which retains greys and black and which softens the primary colors, and which thereby is particularly pleasing to the eye, while retaining its brilliance and tone.

It is, accordingly, a prime object of the present invention to provide a simplified system of color television, requiring no moving parts for transforming monochrome images into color images.

It is a further object of the invention to provide a simple compatible television system, capable of providing either black and white or color pictures, selectively, in response to the mere actuation of a switch.

It is a further object of the present invention to provide a single tube device for producing color television pictures, which shall be simpler than tubes for the same purpose which have heretofore been developed, positive in operation, and more economical to fabricate.

It is a further object of the invention to provide a color televisions system utilizing a screen which is translucent to color lights in response to impact by an electron beam, the beam being utilized to produce monochrome pictures, and the light being controlled in respect to its color in synchronism with the production of sequential color fields, so as to produce polychrome images from the monochrome images.

It is a further object of the invention to provide a color light internally of a cathode ray tube, which is utilized to generate monochrome images, by producing white light within the tube by an electron beam scanning process, and converting the white light to colored light by means of a dichroic filter.

It is a further object of the invention to provide differently colored light in sequence internally of a cathode ray tube which is utilized to produce monochrome images, by utilizing electron beam scanning of fluorescent surfaces, capable under electron impact, of producing light of different colors directly.

It is another prime object of the invention to provide a system of color television in which monochrome images are generated on a conventional fluorescent screen, and colored light is transmitted through that screen to color the monochrome images.

Another object of the invention resides in a color television system employing a screen which fluoresces and which also is rendered transparent, in response to impact by an electron beam.

Still another object of the invention resides in the provision of a system for generating monochrome or polychrome television pictures, selectively, and in which selection may be accomplished by actuation of an electrical switch.

The above and still further features, objects and advantages of the invention will become apparent upon consideration of the following detailed description of various embodiments of the invention, especially when taken in conjunction with the accompanying drawings wherein.

Figure 1:
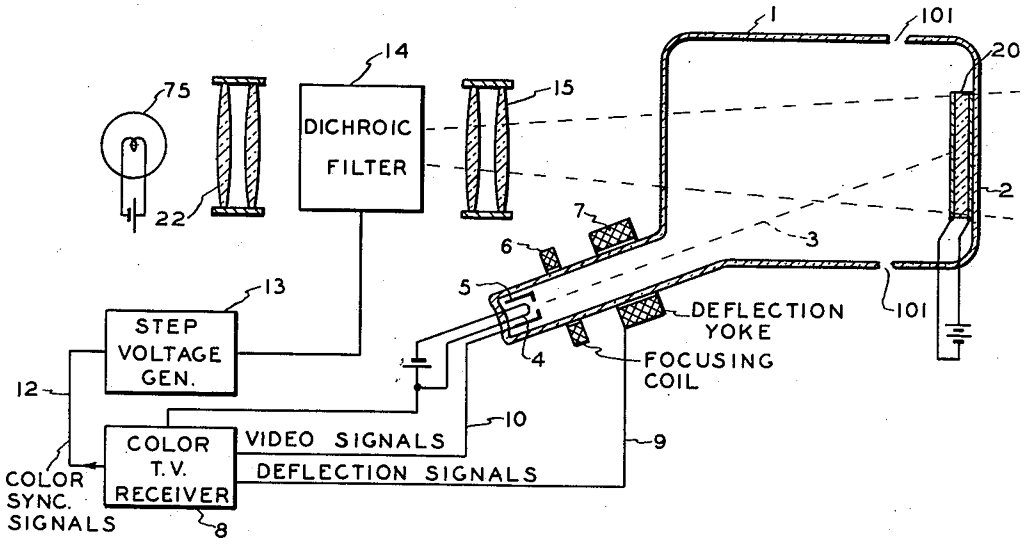
Figure 1 is a schematic diagram of a system of color television wherein is utilized a screen rendered translucent in response to impact by electron beams, for generating effective monochrome images, and wherein light successively of different colors is applied through the translucent screen from externally of the tube.

Proceeding now more specifically by reference to the accompanying drawings, in Fig. 1 reference numeral 1 denotes a cathode ray tube envelope having a face 2. A beam of electrons 3 is produced by means of an electron source in the form of a cathode 4, the beam being modulated by means of an intensity control electrode 5, and focused by a focusing coil 6. It will be understood that the tube also includes the normal constituents of an electron gun, including the necessary anodes and beam forming electrodes, the latter being, however, not illustrated, in order to simplify the exposition of the invention and its illustration.

The deflection of the electron beam 3 may be accomplished by means of a deflecting yoke, conventionally illustrated as a composite coil 7, having provision for vertical and horizontal deflection separately in response to suitable deflection currents. It will be realized that while I have illustrated the invention as utilizing magnetic deflection, that electrostatic deflection may be utilized instead, without departing from the principles of the invention.

A color television receiver is generically indicated at 8, and this color television receiver produces the necessary deflection signals on a lead 9, for application to the deflection yoke 7, so that successive fields may be generated in accordance with the CBS color television system, presently approved by the Federal Communications Commission.

Additionally, on a lead 10 are provided video signals, the lead 10 being connected with the intensity control electrode 5, for modulating the intensity of the electron beam 3 in accordance with the constitution of the separate fields of the picture. The lead 11 is illustrated as providing a reference point, by connection to the cathode 4. In addition, on a lead 12 is provided signals occurring in synchronism with the color frames, i. e. one synchronizing signal in response to each group of color fields, required to make up a color picture. In the CBS system six color fields are required to make up a color picture, these following in the succession red, green and blue, the use of six instead of three fields being required in order to produce interlaced frames. Accordingly each group of three fields constitutes a color frame. The synchronizing output available on the lead 12 is constituted, then, of signals occurring at the initiation of each color frame, so that one signal occurs at the initiation of each red field. The synchronizing signals available on the lead 12 are applied to a step voltage generator 13, for application to the dichroic filter 14, which may be fabricated in accordance with the teachings of the Land patent, U. S. No. 2,493,200, the voltages provided by the step voltage generator 13 being those required in the Land system, and exemplified in Table 1 of Land at col. 6 of his patent.

When actuated in response to suitable voltages, the dichroic filter 14 passes color components from the source of white light 15, and these components may be red, green or blue, selectively, in accordance with the voltages applied to the dichroic filter 14, and accordingly may follow in succession those required by the CBS system, i. e. in the order red, green, blue.

Monochrome images are accordingly produced on a screen 20, which may be of the type disclosed in Rosenthal Reissue Patent 22,734, issued March 19, 1946, or Smith Patent No. 2,473,825. Specifically, in the case of the Rosenthal patent, selected as exemplary, the screen is made of a transparent crystalline material, and may be a single flat crystal or a mosaic of small crystals, or of micro-crystalline structure. Alternatively, a composite crystal, in solid solution, or a mixture of two or more crystalline materials may be used. Examples of suitable crystals are alkali and alkaline earth, and alkalies such as the chlorides, bromides and iodides of sodium and potassium, and other chemical substances, described more completely in the above mentioned Rosenthal patent.

In accordance with the invention the screen 20 is scanned just as is the fluorescent screen of a normal cathode ray tube, to produce monochrome picture fields, by suitable intensity modulation of electron beam 3 during scanning.

It is well known that the screen 20, constructed in accordance with the teachings of Rosenthal Reissue Patent No. 22,734, becomes translucent, or transparent, at those points where the electron beam 3 impacts thereon, and accordingly that the screen 20 provides transparent portions corresponding with the normal monochrome images.

The source of light 15 is focused on dichroic filter 14, via lenses 22, and the output of the filter 14 is then focused by means of further lens 15 on the plate 20, the latter serving to modulate the output of the dischoric filter 14. The dichoric filter on the other hand produces sequentially light of the proper colors, i. e. red, green and blue, in synchronism with the production of monochrome fields on the plate 20. The production of these colors is accomplished, as in Fig. 1, by applying to the dichroic filter 14 suitable voltages, derived from step voltage generator 13, in response to color synchronizing signals available on the lead 12, and deriving from the color television receiver 8. Accordingly an observer situated before the plate 20 observes color images, rather than monochrome images, as the lights of successively different color provided by the dichoric filter 14 are modulated in intensity in accordance with the picture images painted on the plate 20 by the cathode ray beam 3.

In the system of Fig. 1 colored light deriving from the dichoric filter 14 is on for each complete color field. This may be a disadvantage, since each point of each monochrome image produced on the plate 20 tends to decay after it has been produced. If then light is passing continually through a point of a monochrome image which is in process of decay, the amount of light passing through that point, over the entire time of a field, may be incorrect.

It is therefore of advantage to provide a scanning source of light, which scans over the plate 20 in synchronism with production of an image in each field. This is accomplished in the system of Fig. 2.

Figure 2:
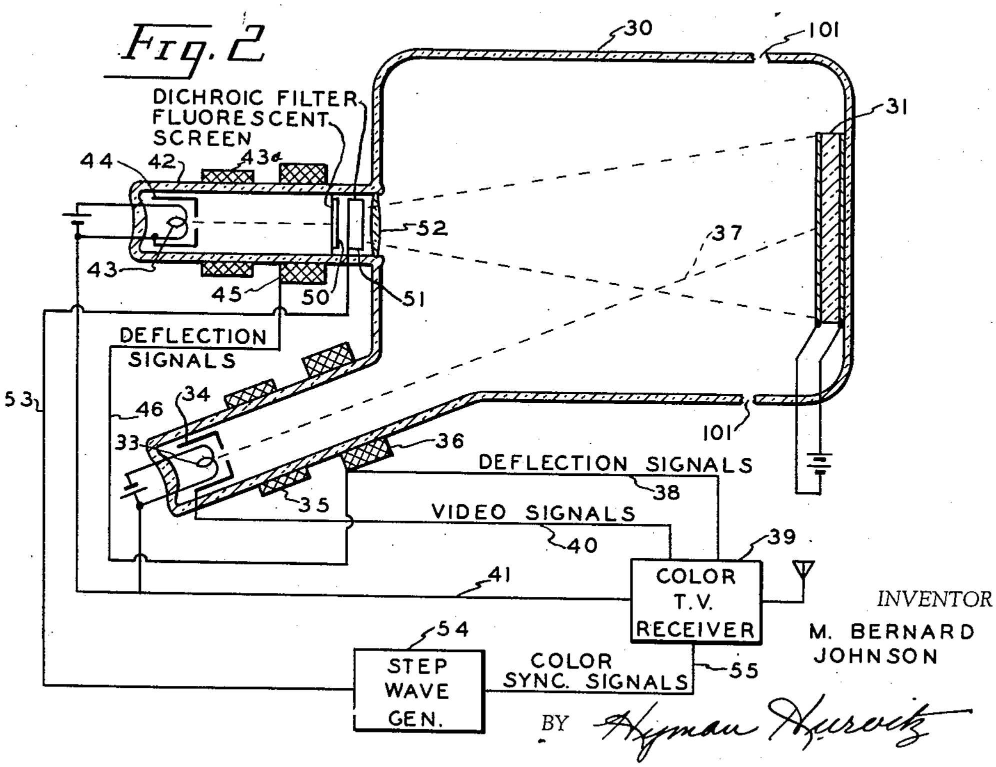
Figure 2 is a modification of the system of Figure 1 wherein the light is electronically produced internally of the cathode ray tube.

Referring now more specifically to the system of Fig. 2, there is provided a two-gun cathode ray tube in a vitreous container 30, the viewing face of the tube consisting of a Rosenthal plate 31, as in the system of Fig. 2 (alternately, a Smith type screen may be employed). A first gun of the two-gun tube comprises a cathode 33, an intensity control electrode 34, focusing electrode 35, deflection yokes 36, and the necessary anodes and beam forming electrodes, not illustrated in the diagram, since these are well known per se. The intensity control electrode accordingly controls the intensity of an electron beam 37, deriving from the cathode 33, and the deflection yokes 36 serve to deflect the beam 37, under the control of deflection signals provided on a lead 38 deriving from a color television receiver 39. The deflection signals provided on the lead 38, when applied to the yoke 36 serve to scan the beam 37 across the viewing plate 31 in successive fields, in accordance with the CBS system of color television, the intensity of the beam being modified in accordance with video signals provided over a lead 40 and deriving from the color television receiver 39. The lead 41 is connected to the cathode 33 and provides a common reference point of potential for the cathode ray tube 30 and for the color television receiver 39.

Accordingly there is provided, on the face of the viewing plate 31, successive monochrome images, representatives successively of the red, green and blue components of a color picture. As has been pointed out hereinbefore, if the viewing screen 31 is illuminated by colored light in the sequence red, green and blue, and in the appropriate field sequence, a viewer will perceive a color television picture on the plate 31 instead of monochrome pictures.

The second gun 42 of the two gun tube, is utilized to produce the necessary monochrome light by a scanning process which is synchronized with the scanning of the viewing plate 31. To this end a second gun 42 comprises a cathode 43 and an intensity control electrode 44. The latter may be tied to the cathode 43 since variations of the beam produced in the second gun 42 are not required. A beam focusing coil 43*a* is provided, and there are further provided the necessary accelerating anodes and beam forming electrodes, not illustrated in the diagram in order to simplify the latter. The beam 44 formed by the second gun 42 passes through the deflection yokes 45, which are supplied with deflection signals via a lead 46, the latter being supplied with deflection signals identical with those supplied to the deflection yoke 36. Accordingly, the electron beam 34 scans over a fluorescent screen 50 in synchronism with the scanning of the beam 37 over the viewing plate 31. Extremely high accelerating voltages are employed to accelerate the beam 44, and accordingly the latter strikes the fluorescent screen 50 with extremely high energy, and causes an extremely brilliant image to be produced. The light from the fluorescent screen 50 is then passed through a dichroic filter 51, and focused by means of a lens 52 on the viewing plate 31. The dichroic filter 51 is driven by means of suitable step voltages supplied by a lead 53 from a step wave generator 54 under the control of color synchronizing signals provided on a lead 55. The voltages applied to the dichroic filter 51, as in the embodiments of my invention illustrated in Figs. 1 and 2 of the accompanying drawings, are varied or interchanged at the appropriate field rate, and in synchronism with the production of the separate fields of the picture as generated in monochrome on the face of the viewing plate 31. Accordingly, successive monochrome pictures are viewed with the appropriately colored light deriving from the dichroic filter 51, to reproduce the desired color pictures.

The decay time of the fluorescent screen 50 may be made at least approximately similar to that of the viewing screen 31, so that substantially perfect pictures are produced by the system, each element of the picture being controlled to have precisely the proper intensity and hue.

In the systems of Figs. 1 and 2 the fact that the colored light produced must be passed through a dichroic filter results in considerable loss of light intensity, and accordingly systems of this character are inherently slightly inefficient in respect to light utilization. This is not a difficult obstacle to overcome, since it involves merely the utilization of brighter sources of light than would be the case in a perfect light transmitting device. At the same time it is desirable to provide a television system which is capable of generating extremely intense color images, with substantially no loss of light, since thereby the system may be employable as a projection system for large screen images. I have accordingly provided a system of color television, illustrated in Fig. 3 of the accompanying drawings, wherein no dichroic filters are employed, and wherein extremely brilliant images may be produced, capable of expansion to large screens, and consequently suitable for projection color television.

Figure 3:
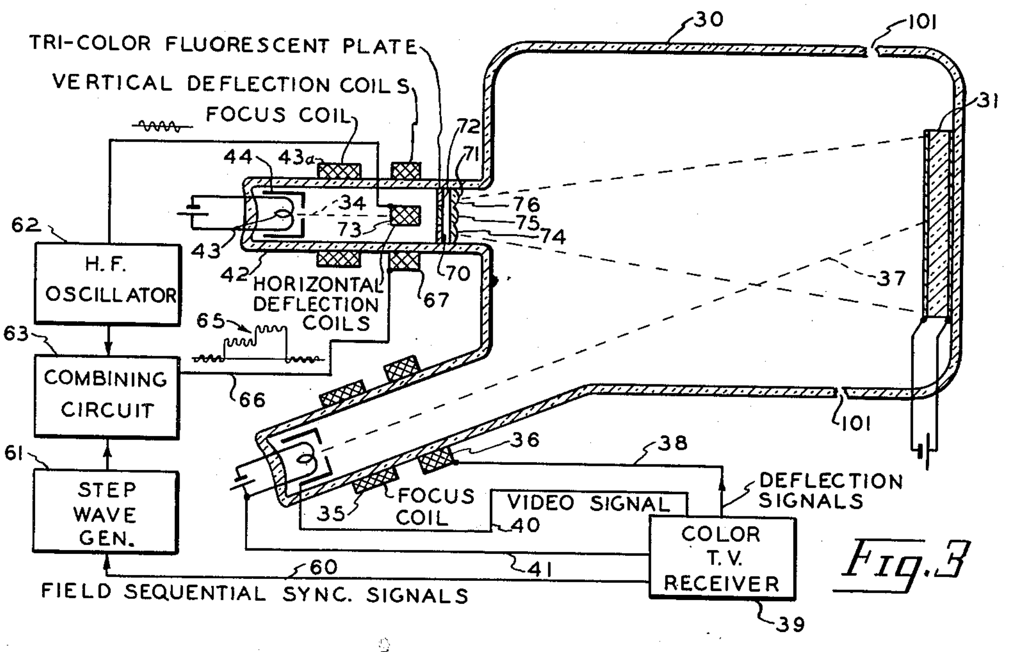
Figure 3 is a modification of the system of Figure 2 wherein colored light is produced internally of the cathode ray tube which produces monochrome images, by sequential scanning of fluorescent surfaces selectively capable of producing light of different colors.

Reference is now made to Fig. 3 of the accompanying drawings, which is similar to the system of Fig. 2 except in respect to the mode of colored light projection. Accordingly, corresponding parts in Figs. 2 and 3 have been identified by the same numerals of reference, and the description of the corresponding portions of the two devices dispensed with.

In the system of Fig. 3, as in the system of Fig. 2, monochrome images are recorded on the visual screen 31 by means of an electron beam 37. Signals representative of each color frame are provided on the lead 60. It is understood that a frame includes three fields sequentially, viz. red, green and blue, and that the CBS system of color television provides synchronizing signals at the initiation of each red field, which may be separated from the remaining synchronizing signals of the system. The synchronizing signals provided on the lead 60 are applied to a step wave generator 61, which in response to each synchronizing signal provides three stepped voltages, having values for example of —50 v. for the red field, zero for the green field, and 50 v. for the blue field. There is further provided a high frequency oscillator 62, which may have an output frequency of the order of 10 mc., although this value is not critical. The output of the high frequency oscillator 62 is applied to a combining circuit 63 to which is also applied the step wave provided by the step wave generator 61. At the output of the combining circuit is then provided the step waves, as generated by the step wave generator 61, and superposed on each of the steps is the oscillations provided by the high frequency oscillator 62. The signals are represented diagrammatically at 65, and are supplied on a lead 66 to the vertical deflection coils 67 available for deflecting the beam 44 generated by the electron gun 42.

Accordingly, upon each change of color field the electron beam 34 is vertically deflected to a median position determined by the then value of the step wave provided by the step wave generator 61, and superposed on this median position are extremely high frequency oscillations at the frequency of the output of the oscillator 62. The voltages are so selected that the electron beam 34 scans over in succession three separate fluorescent surfaces, the first one of which, 70, may generate red color, the second one of which, 71, may generate a green color, and the third one of which, 72, may generate blue light, when impacted by the electron beam 34.

At the same time the output of the high frequency oscillator 62 may be applied to the horizontal deflection coils 73 to provide a continual horizontal oscillation of the beam 34 across that one of the fluorescent surfaces 70, 71, or 72, being impacted at the time. There is thereby provided a very liberal scan of each of the fluorescent surfaces 70, 71, and 72, by the electron beam 44, and consequently the production of intense light in sequence from the three fluorescent surfaces. The sequence of light production is in the order red, green, blue, and the times of shift from one color to another is coincident with the time of change of monochrome fields from images representative of red to an image representative of green, from an image representative of green to an image representative of blue, and from an image representative of blue back to an image representative of red. The light from each of the fluorescent surfaces 70, 71 and 72 is projected against the viewing surface 31 by means of individual lenses 74, 75 and 76, respectively. Accordingly, the viewing surface 31 is flooded with intense light, first red, then green, then blue, in field sequence, and in synchronism with the production of monochrome field images, and the viewer perceives on the face of the screen 13 a polychrome image.

Figure 4:
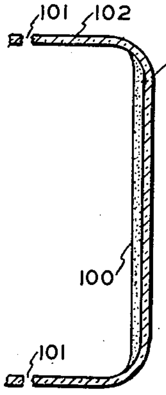
Figure 4 illustrates a portion of a cathode ray tube, having a normal fluorescent screen, for use in substitution of electrically controlled screens.

It will be realized that the light producing system of the embodiment of my invention illustrated in Fig. 4 of the accompanying drawings is extremely efficient, since the light as produced at the fluorescent surfaces 70, 71 and 72, is directly applied to the viewing surface 31.

While I have described three specific embodiments of my invention, it will be clear that modifications of these may be resorted to without departing from the principle of the invention.

In particular it will be seen that the principles of the invention may be employed to generate color television images of the line sequential type, or of the dot sequential type, by suitable gating of the light sources, in synchronism with the production of the monochrome images in accordance with the particular system desired. Since in each case the interchange from one color to another may be accomplished instantaneously, and substantially without time lag, the system may be employed in very high definition systems of television, whether of the field sequential, line sequential or dot sequential systems, and this merely by the use of appropriate gating waves for the light producing sources.

It will be realized, at the same time, that the system is capable of producing black and white images by the simple expedient of opening a switch leading to the device which provides the color. In this sense the system may be said to be compatible, as well as wholly electronic.

It has been herein above noted that while the principles of my invention may be applied utilizing cathode ray tubes employing special screens, i. e. of the Rosenthal or Smith types, that I have determined experimentally that the invention may also be employed utilizing conventional fluorescent screens. I have found that color light will pass through such screens, which are translucent, and that the quantity of color light which passes through the screen is a direct function of the intensity of fluorescence of the screen. This leads to the conclusion that if monochrome images are generated on a fluorescent screen, and colored light passed through the screen, that a colored image will be produced. My discovery is of primary importance to the art, since it enables elimination of the Smith or Rosenthal screen, and the substitution of a conventional screen.

In addition the ultimate picture, as viewed, is a composite of a monochrome and colored image, or is a colored monochrome image, hence may be made extremely intense, and of high definition and quality.

In the system of Fig. 4 I have illustrated a portion of a cathode ray tube, as 30, having a fluorescent screen 100, and I have broken away the walls of the tubes used in the systems of Figs. 1–3, inclusive, as at 101, to demonstrate that the screen of Fig. 4 may be substituted therein, without modifying the system involved.

Figure 5:
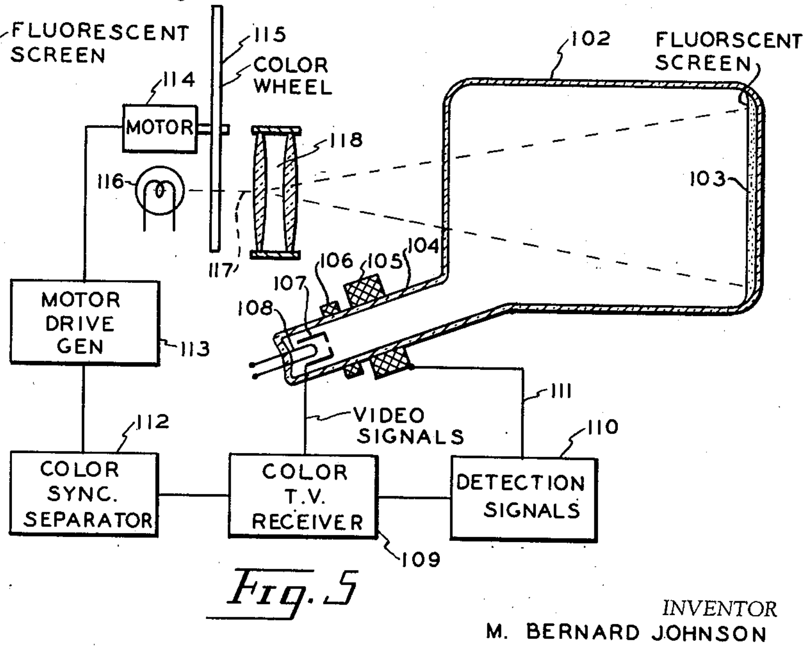
Figure 5 is a functional block diagram of a television system of the frame sequential type, employing a small colour wheel, and the translucency of a fluorescent screen.

In the system illustrated in Fig. 5 of the accompanying drawings I provide for the generation of multichrome television pictures by means of a simplified system of the CBS type. In the system of Fig. 5 I utilize a color wheel to translate monochrome images into polychrome images. However, whereas in the conventional CBS system the color wheel is placed before the fluorescent screen, and the translation of monochrome to polychrome images is accomplished by viewing monochrome images through a color wheel, in the system of Fig. 5 the colors are transmitted to the reverse side of the fluorescent screen via a color wheel, and the fluorescent screen is normally viewed, without the interposition of a color wheel. The system accordingly has two distinct advantages. In the first place no whirling color disc is placed before the television screen, to interfere with the pleasure of the viewer. In the second place the color wheel which is utilized may be of extremely small dimensions, since the colored light provided thereby may be diverged by means of a suitable lens system to the size of the fluorescent screen, regardless of what size that screen may be.

Referring now more specifically to Fig. 5 there is provided a cathode ray tube 102, having a fluorescent screen 103 and a cathode ray gun 104, including deflection yokes 105, focusing coils 106 and an intensity control grid 107 and cathode 108. Signals provided by a color TV receiver 109 are applied to the intensity control grid 107, in field sequential fashion, in accordance with the normal CBC system as approved by the FCC. There are derived from the color TV receiver 109 deflection signals by means of a deflection signal generator 110, and the latter are applied by means of a lead 111 to the deflection yokes 105, to generate the sequential fields. At the same time a color sync separator 112, is coupled to the color TV receiver 109, or incorporated therewith, in accordance with current practice. This color sync separator provides synchronizing signals at the frame repetition rate, which are applied to a motor drive generator 113, which drives a motor 114. The motor 114 in turn drives a color wheel 115 in synchronism with the production of various monochrome field images on the screen 103. A source of white light 116 is provided on the side of the color wheel 115 which is remote from the fluorescent screen 103. The white light accordingly passes through the color wheel 115, being thereby transformed into sequentially occurring colored lights in the primary colors. The colored light, indicated by the dotted line 17 is diverged by means of a lens system generally indicated at 118, and projects against the rearward side of the fluorescent screen 103, the rearward wall of the envelope of the tube 102 being made suitably transparent for that purpose.

While I have employed a fluorescent screen in the tube 102, this being the preferred mode of practicing my invention, because of its simplicity, and its correspondence with conventional practices, it will be clear that I may utilize screens of the Rosenthal or Smith types in place of the fluorescent screen 103, should I so desire.

Figure 6:
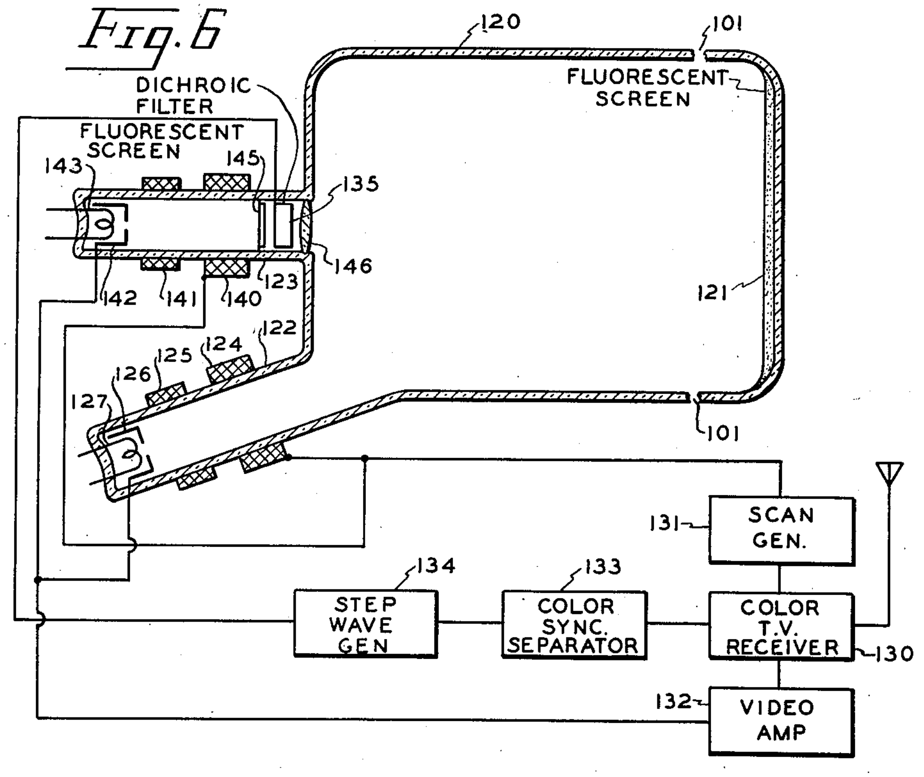
Figure 6 is a functional block diagram of a television receiver employing a special double screen tube, one of the screens being associated with a dichroic colour filter.

The system of Fig. 6 is analogous to the system of Fig. 5, except in that no mechanical parts are utilized in the system of Fig. 6, and further in that colored light projected through the screen of the system of Fig. 6 is in the form of monochrome images in sequential colors. Accordingly, in the system of Fig. 6 two images are provided. One of these images is generated on a fluorescent screen which generates conventional black and white pictures, while the other is generated on a fluorescent screen which generates further black and white images, these further black and white images being projected to the first mentioned fluorescent screen via a dichroic filter, which transforms black and white light into monochromatic light in the primary colors.

Referring now more specifically to Fig. 6 of the accompanying drawings, the reference numeral 120 represents an envelope of a two-gun cathode ray tube, having a fluorescent screen 121, a first gun 122, and a second gun 123.

The first gun 122 is the black and white gun of the system, and comprises deflection yokes 124, focussing coils 125, an intensity control electrode 126, a cathode 127, and the usual necessary anodes and voltage supplies not shown in order to simplify the drawings.

A color television receiver 130 is provided, from which is derived in conventional fashion, scanning voltages synchronized with the color fields of the CBS system, and indicated by the block 131, video signals representative of the components of the separate fields, which may be amplified by a video amplifier 132, and color synchronizing signals separated by a color sync separator 133. The color sync separator provides one synchronizing signal for each frame of the composite color television signal, and the latter is utilized to synchronize a step wave generator 134, which generates three step voltages, for application to a dichroic filter 135, of the Land type above referred to. Accordingly, the dichroic filter 135 passes light of the primary colors as utilized in the CBS system, in sequence. The output of the scanning separator 131 is applied to the deflection yokes 124, so that rasters of the field sequential type are generated on the fluorescent screen 121.

The output of the video amplifier 132 is applied to the intensity control electrode 126 of the gun 122, to generate monochrome image fields on the fluorescent screen 121. Accordingly were the gun 122 alone operating there would be visible on the screen 121 black and white images representative of all the components of a transmitted colored television picture.

In order to provide for the introduction of color into the picture, the second gun 123 is provided. The gun 123 includes deflecting yoke 140, focussing coil 141, intensity control electrode 142, and cathode 143, together with the further essential anodes, sources of voltage, and the like, which are, per se, conventional and which are accordingly omitted from the figure.

It is within the gun 123 that the dichroic filter 135 is inserted, and intermediate the filter 135 and the intensity control electrode 142 and the deflection yokes 140, is provided a fluorescent screen 145, which is capable of providing black and white images when properly scanned by an electron beam, which is properly modulated in intensity. In order to provide such a beam, the deflection voltages provided by the scan generator 131 is applied to the yokes 140. The video output provided by the video amplifier 132 is supplied to the intensity control electrode 142. It follows that duplicate images will be generated on the fluorescent screen 121 and on the fluorescent screen 145. The images generated on the screen 145 are passed through the dichroic filter 135, and diverged by means of a suitable lens system, conventionally illustrated at 146, on to the fluorescent screen 121. The color images so generated are superposed on the monochrome black and white images generated on the screen 121 by the gun 122. The color images pass through the screen 121, which is translucent, and pass through in modulated amounts depending on the intensity of fluorescence of the screen 121 at various points thereof. The viewer of the screen 121 perceives a black and white image, and also perceives a color image deriving from the screen 145 and the dichroic Land filter 135. The two images being in superposition, there is apparent to the eye of the observer a colored image. At points of the screen where no fluorescence exists, i. e. at black or dark grey portions of the image, there will correspondingly be no colored light transmitted to the screen, and accordingly true black or grey may be included in the colored pictures. On the other hand, as the fluorescent screen 121 becomes brighter, at any given point, so will the colored light applied to that point be correspondingly brighter. Accordingly, the system of Fig. 6 provides extreme color detail, coupled with the introduction into the color system of bright light components.

It will be noted that the envelope 120 is broken away at 101, which serves to indicate that screens of the Rosenthal or Smith type may be substituted for the fluorescent screen 121. In such case the screen becomes transparent or translucent in accordance with the separate field images, and a colored picture is transmitted through the translucent screen, in place of a flat colored light, as in the systems of Figures 1–3 inclusive.

Figure 7:
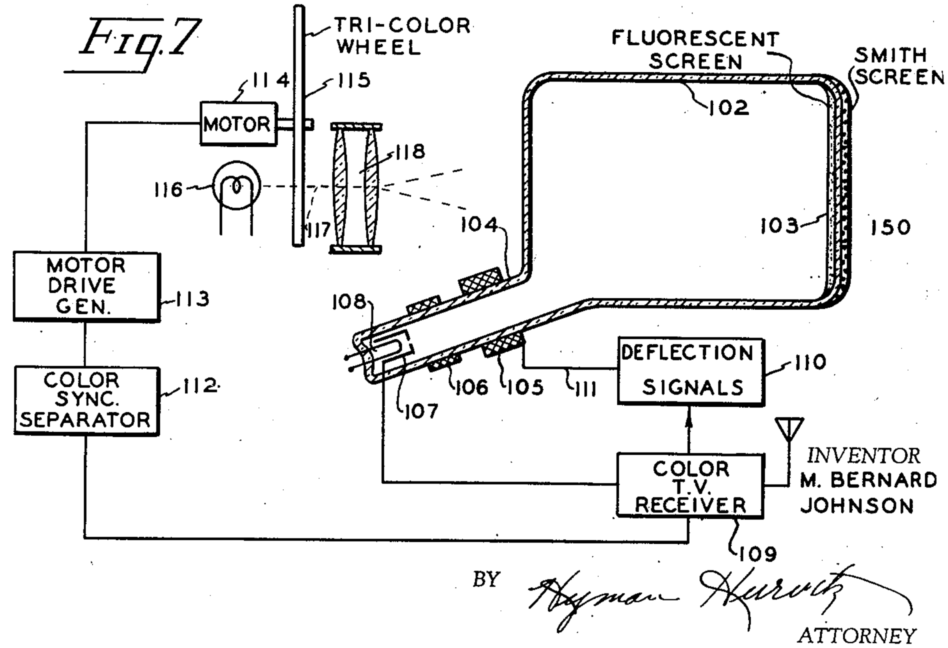
Figure 7 is a variant of the system of Figure 5, employing a special form of viewing screen.

The system of Fig. 7 is essentially similar to the system of Fig. 5 and accordingly identical components in the two systems have been assigned identical numerals of reference. The difference between the systems of Figures 5 and 7 resides in the character of the screen which is employed. In the system of Fig. 5 a conventional fluorescent screen is employed in a cathode ray tube 102. In the system of Fig. 7, on the other hand, there is utilized not only a fluorescent screen internally of the tube 102, but also a screen of the Smith type externally of the tube 102. It follows that not only is a colored image generated, but the normal action of the fluorescent screen in response to electron impact, above pointed out, that the screen becomes transparent to colored light in proportion to the intensity of its fluorescence, is supplemented by the action of the Smith screen, which becomes transparent in proportion to the intensity of an electron beam impacting any given point of the glass envelope adjacent a corresponding point of the Smith screen. There is, accordingly, a dual light valving action at the screen itself. The Smith screen controls the amount of light output observable from the fluorescent screen, and both the Smith and the fluorescent screen serve to control the amount of colored light which may be observed from the front of the tube. This double light valving effect results in an extremely sharp picture, and in very adequate intermixing of the black and white light with the color light, to form the multichrome images desired in the system.

The present specification has assumed a considerable knowledge of the CBS sequential field color television system. Such knowledge is available to all those skilled in the pertinent art. References to the conventional CBS system and disclosures of that system will be found in the statement of Peter C. Goldmark, for the Columbia Broadcasting System, Inc., before the Federal Communications Commission U. H. F. Color Television Hearing, January 1947, Docket No. 7896. In addition, reference is made to an article by Goldmark, Dyer, Piore and Hollywood entitled, "Color television, part 1," in Proceedings of the IRE for April 1942. Part two of this article may be found in the Proceedings of the IRE for September 1943. In addition, Goldmark and Sorel have described the CBS system in proceedings of the First National Electronics conference, October 1944, and Goldmark, Dyer, Piore, and Hollywood, have published an article entitled "Color television," in the Journal of Applied Physics for November 1942. Reference to these articles will provide an adequate basic understanding of the CBS system, as well as the provision of various circuit details, modes of synchronization, modes of synchronizing color separation, and the like, which have been omitted from the present specification, in order to avoid undue complication of the latter.

While I have described various modifications of my system which are particularly applicable to the CBS sequential field color television system, for improving the latter, since it is that system which has found approval in the eyes of the FCC, the principles of my invention may be applied to various known types of color television systems, such as the CTI line sequential color television system, the RCA dot sequential, the three gun tri-color kinescope method, or in systems of the type wherein separate cathode ray tubes are applied to generate colored images in the separate primary colors. It will further be clear that modifications of the present system, in respect to details and general arrangement, may be resorted to without departing from the true spirit of the invention as defined in the appended claims.

I claim:

1. In a colour television system, means for producing successive monochrome images representative of colour field images of a polychrome image, said means comprising a cathode ray tube, a screen for said cathode ray tube, said screen normally opaque and adapted to be rendered controllably translucent at any point thereof which is subject to impact by high velocity electrons, in accordance with the energy of said electrons, means in said cathode ray tube for generating a beam of electrons, means for scanning said beam over said screen in successive vertically displaced lines, and for modulating said beam during said scanning, to generate successive monochrome images, a source of coloured light controllable to provide selectively light of three primary colours, means for controlling said source of light to provide said coloured light of three primary colours each during scanning of one of said fields, and means for projecting said coloured light through said screen.

2. The combination in accordance with claim 1 wherein said source of coloured light is external to said cathode ray tube.

3. The combination in accordance with claim 1 wherein said source of coloured light is external to said cathode ray tube and comprises a source of white light and a controllable colour valve for selectively passing one of said three primary colours.

4. The combination in accordance with claim 3 wherein said colour valve is a dichroic light filter.

5. The combination in accordance with claim 1 wherein said source of coloured light is internally of said cathode ray tube.

6. The combination in accordance with claim 1 wherein said source of light is internally of said cathode ray tube and comprises a fluorescent surface, means for causing said fluorescent surface to fluoresce with the production of essentially white light, and means for selecting light of said three primary colours from said white light in sequence.

7. The combination in accordance with claim 6 wherein said last means comprises a dichroic filter.

8. The combination in accordance with claim 1 wherein said source of light is located internally of said cathode ray tube and comprises an auxiliary means for generating a beam of electrons, a fluorescent surface, means for scanning said beam of electrons across said fluorescent surface in synchronism with said scanning of said first beam over said first mentioned screen and in an identical position, a voltage controllable dichroic light filter, means for projecting light from said fluorescent surface through said dichroic light filter and through said screen, and means for applying control voltage to said voltage controllable dichroic light filter to pass only said light of said primary colours.

9. The combination in accordance with claim 1 wherein said source of light comprises three fluorescent surfaces, each capable of fluorescing only in light of the one of said primary colours, and means for generating a beam of electrons and for selectively projecting said beam of electrons against said three fluorescent surfaces.

References Cited in the file of this patent

UNITED STATES PATENTS

| | | |
|---|---|---|
| 2,191,515 | Von Bronk | Feb. 27, 1940 |
| 2,330,172 | Rosenthal | Sept. 21, 1943 |
| 2,493,200 | Land | Jan. 3, 1950 |
| 2,577,756 | Harrington | Dec. 11, 1951 |
| 2,586,635 | Fernsler | Feb. 19, 1952 |
| 2,611,817 | Schwarz | Sept. 23, 1952 |
| 2,616,962 | Jaffe | Nov. 4, 1952 |
| 2,623,109 | Bell | Dec. 23, 1952 |